US009945455B2

(12) United States Patent
Cipollone et al.

(10) Patent No.: US 9,945,455 B2
(45) Date of Patent: Apr. 17, 2018

(54) TRANSMISSION SYSTEM COMPRISING AN OIL WET TOOTHED BELT

(71) Applicant: DAYCO EUROPE S.R.L., Chieti (IT)

(72) Inventors: Franco Cipollone, Chieti (IT); Massimiliano Delli Rocioli, Montesilvano (IT); Marco Di Meco, Pescara (IT); Luigi Laviola, Chieti (IT)

(73) Assignee: Dayco Europe S.R.L., Chieti (IT)

( * ) Notice: Subject to any disclaimer, the term of this patent is extended or adjusted under 35 U.S.C. 154(b) by 93 days.

(21) Appl. No.: 14/908,141

(22) PCT Filed: Jul. 29, 2014

(86) PCT No.: PCT/IB2014/063525
§ 371 (c)(1),
(2) Date: Jan. 28, 2016

(87) PCT Pub. No.: WO2015/015424
PCT Pub. Date: Feb. 5, 2015

(65) Prior Publication Data
US 2016/0186840 A1  Jun. 30, 2016

(30) Foreign Application Priority Data

Jul. 29, 2013 (IT) .............................. TO2013A0640

(51) Int. Cl.
| | | |
|---|---|---|
| *F16H 7/18* | (2006.01) | |
| *F16H 7/08* | (2006.01) | |
| *F16H 7/02* | (2006.01) | |

(52) U.S. Cl.
CPC .............. *F16H 7/18* (2013.01); *F16H 7/023* (2013.01); *F16H 7/08* (2013.01);
(Continued)

(58) Field of Classification Search
CPC ... F16H 7/18; F16H 7/023; F16H 7/08; F16H 2007/026; F16H 2007/0842; F16H 2007/0872; F16H 2007/0897
See application file for complete search history.

(56) References Cited

U.S. PATENT DOCUMENTS 3,730,011 A * 5/1973 Cahill .................... F16H 7/023
  347/104
6,435,994 B1 * 8/2002 Friedmann ................ F16H 7/18
  474/111
(Continued)

FOREIGN PATENT DOCUMENTS

| CN | 101052828 A | 10/2007 |
| CN | 101331347 A | 12/2008 |
(Continued)

OTHER PUBLICATIONS

CN First Office Action issued in CN2014800537791 (7 pages).

*Primary Examiner* — William E Dondero
*Assistant Examiner* — Robert T Reese
(74) *Attorney, Agent, or Firm* — FisherBroyles, LLP; Susan M. Oiler (57) ABSTRACT

A transmission system is provided that has a drive pulley, at least one driven pulley and an oil wet toothed belt. The toothed belt includes a toothing and a back, a first portion, wherein the toothing is coupled to the drive pulley, a second portion wherein the toothing is coupled to at least one driven pulley, a first taut branch which develops towards the driving pulley and a second slack branch which develops towards the driven pulley. The transmission system also includes a fixed containment guide having at least a first wall facing the toothing and/or the back positioned at a distance from the toothed belt between a minimum distance where at rest it is
(Continued)

not in contact with the toothed belt and a maximum distance equal to 5% of the length of one between the taut branch and the slack branch.

17 Claims, 5 Drawing Sheets

(52) U.S. Cl.
CPC ............ *F16H 2007/026* (2013.01); *F16H 2007/0812* (2013.01); *F16H 2007/0872* (2013.01); *F16H 2007/0897* (2013.01)

(56) References Cited

U.S. PATENT DOCUMENTS

| | | | | |
|---|---|---|---|---|
| 8,057,336 | B2* | 11/2011 | Wodtke | F16H 7/18 474/111 |
| 8,376,883 | B2* | 2/2013 | Inoue | F16H 9/24 474/109 |
| 2008/0085799 | A1* | 4/2008 | Lacy | F01L 1/024 474/141 |
| 2009/0325748 | A1* | 12/2009 | Pflug | F16H 7/18 474/91 |
| 2010/0145591 | A1* | 6/2010 | Rolando | F16H 7/18 701/102 |
| 2015/0005123 | A1 | 1/2015 | Di Meco et al. | |

FOREIGN PATENT DOCUMENTS

| | | |
|---|---|---|
| DE | 3328677 A1 | 2/1985 |
| DE | 3417100 A1 | 7/1985 |
| DE | 4111063 A1 | 10/1992 |
| DE | 19955894 C1 | 1/2001 |
| EP | 2325455 A1 | 5/2011 |
| FR | 2733812 A1 | 11/1996 |
| GB | 2092705 A | 8/1982 |
| JP | S55-161157 U | 11/1980 |
| WO | 2005/080820 A1 | 9/2005 |
| WO | 2008/009544 A1 | 1/2008 |

* cited by examiner

FIG. 5 under normal operating conditions, the toothed belt should not ever be replaced for the entire life of the vehicle.

TRANSMISSION SYSTEM COMPRISING AN OIL WET TOOTHED BELT

CROSS-REFERENCE TO RELATED APPLICATIONS

This application is a National Stage filing of International Application No. PCT/IB2014/063525, filed Jul. 29, 2014, which claims priority of Italian Application No. TO2013A000640, filed Jul. 29, 2013, which are incorporated herein by reference in their entireties.

TECHNICAL FIELD

The present invention relates to a transmission system for an internal combustion engine comprising an oil wet toothed belt or continuously in contact with oil or at least partially in oil bath.

STATE OF THE PRIOR ART

Engines for motor vehicles have been recently developed, comprising a distribution transmission system wherein the chains have been replaced with toothed belts in the same working environment.

Systems of this type have been described in numerous patents of the same applicant, such as WO2005080820.

In said transmission systems the belt is called "oil wet belt" or "belt in oil" and must be able to meet the same duration requirements of equivalent chain transmission or dry belt systems.

With "oil wet belt" or "belt in oil" within the present invention is intended a toothed belt used in transmission systems wherein it is at least partially immersed in oil at rest and/or during operation or in transmission systems wherein the belt is constantly in contact with oil, for example systems wherein the oil is fed on the belt, for example by spraying by way of a special nozzle or by flapping due to the action of the belt and the pulleys.

In particular in said transmission systems there are no separation means between the oil that lubricates the engine and the transmission system itself.

Transmission systems that use an oil wet toothed belt of this type have been described in international patent application WO2005080820 by the same applicant.

Said transmission systems are different from the traditional ones in which the so-called dry toothed belt operate and wherein there are separating means or components that separate the drive toothed belt from the engine oil, which lubricates the various parts of the engine and which can then only accidentally come into contact with the surface of the toothed belt. In dry systems the toothed belt works externally to the engine.

The oil wet belts must then resist the continuous contact with oil at high temperature during the engine operation and not be damaged neither at high operating temperatures, nor at very low temperatures.

Compared to the chain drives, belt drives generally have lower costs and much more reduced friction loss. Also a belt drive is less noisy and the elongation of the belt is lower by at least a quarter compared to that of a chain: this allows to control more precisely the valves of the internal combustion engine and also to save fuel.

Generally the problem at the basis of the transmission systems wherein the belt replaces a chain is to obtain the toothed belt so as to ensure a long life of the same of at least 240,000 km or 150,000 miles namely to ensure that in The transmission systems wherein the toothed belt is oil wet and/or continuously working in oil are generally very similar to those wherein for the transmission of motion a chain is used.

Frequently the compartment wherein the belt is moved is obtained from a surface of the crankcase.

A belt drive generally comprises a drive pulley, at least one driven pulley, a toothed belt comprising a first wound portion, geared or coupled on the driving pulley, a second wound portion, geared or coupled on the driven pulley, a first drive or taut branch that develops towards the drive pulley and a second driven or slack branch on the opposite side that develops towards the driven pulley and a tensioning device to ensure the correct operation of the belt.

It is known for example to use as tensioning device of an oil wet belt a shoe operated by an actuator or by a spring, which is generally arranged on the slack branch. Said shoe differently from many known tensioning devices has the advantage of being able to be mounted in confined spaces and thus make the transmission compact. In this way, the transmission belt can be placed in the same limited space generally occupied by a transmission chain without changing the compartment that houses the transmission.

Alternatively it is also known to use a mechanical tensioner i.e. a different tensioning device for adjusting the tension of a transmission belt.

The mechanical tensioner comprises a pulley of small diameter, mounted on a swinging lever arm. The arm that carries the mechanical tensioner is loaded by a spring. Generally the mechanical tensioner is also arranged on the slack or driven branch.

To prevent the slack branch of the belt from vibrating coming into contact with the taut branch of the belt, the mechanical tensioner is generally placed sufficiently far away from the axis joining the centers of the drive and driven pulley.

The tensioning device generally does not allow avoiding that the other branch of the belt i.e. the taut branch vibrating by a phenomenon called "flapping". The flapping occurs in general whenever the gearing frequency coincides with a multiple of the natural vibration of the belt branch.

Figure 1:
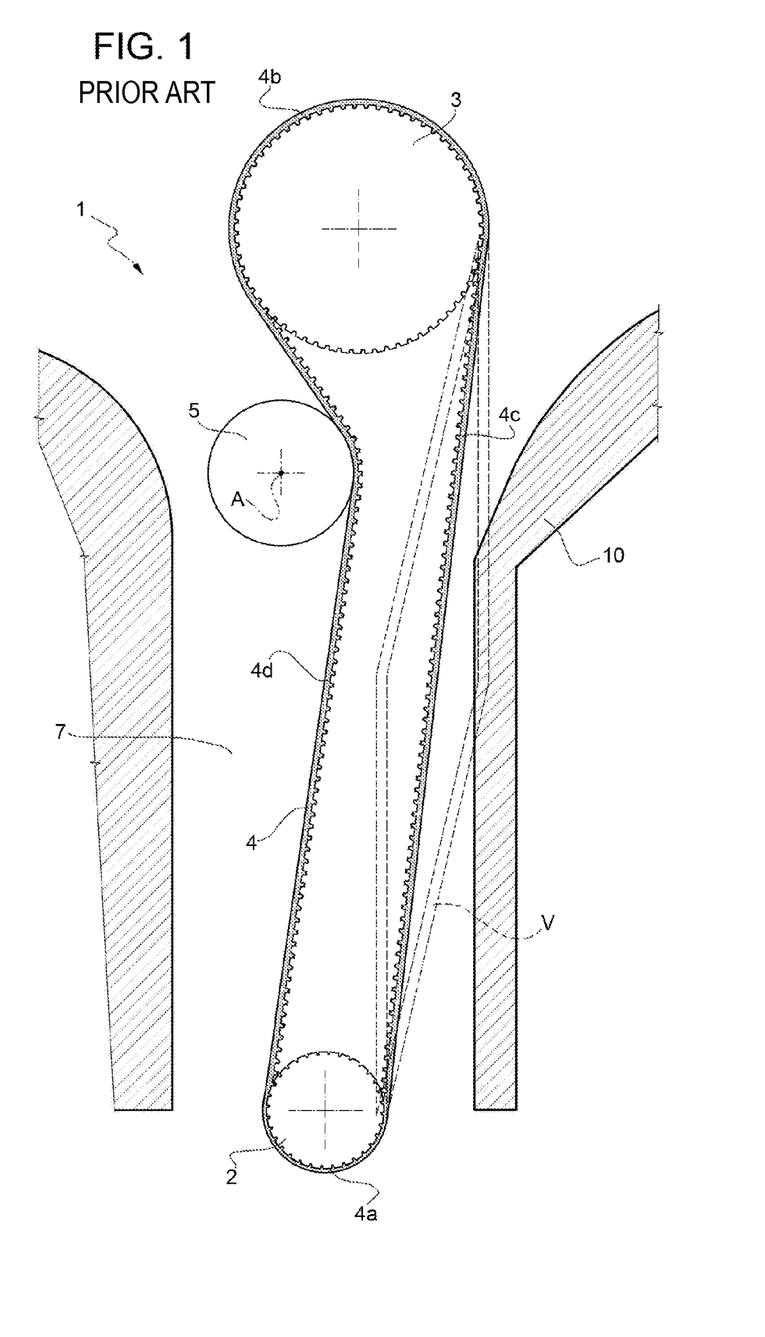
FIG. 1 is a schematic view of a first transmission system obtained according to the prior art.

In FIG. 1 is shown a transmission system 1 comprising a driving pulley 2, a driven pulley 3, a toothed belt 4 and mechanical tensioner 5 on the slack branch.

The toothed belt 4 comprises a first portion 4a coupled to the drive pulley 2, a second portion 4b coupled on the driven pulley, a first taut branch 4c that develops towards the drive pulley 2 and a second slack branch 4d on the opposite side that develops towards the driven pulley 3.

In said transmission system, the taut branch 4c of the toothed belt while vibrating can contact the walls of the compartment 10 of the crankcase, as shown in FIG. 1 where the vibrations are indicated with V in the figure, or even come in contact with the slack branch 4d of the belt, in particular if the mechanical tensioner 5 on the slack branch 4d was not arranged far away enough from the axis joining the centers of the driven pulley 3 and the drive pulley 2. In this way, there is the risk of premature wear of the belt and high noise levels.

To avoid these inconveniences, it has been tried for example to use a second tensioning device, advantageously a touching element or touching belt tensioner also known in English as "touching idler", which ensures a contact with the back of the toothed belt to prevent branch vibrations.

Figure 2:
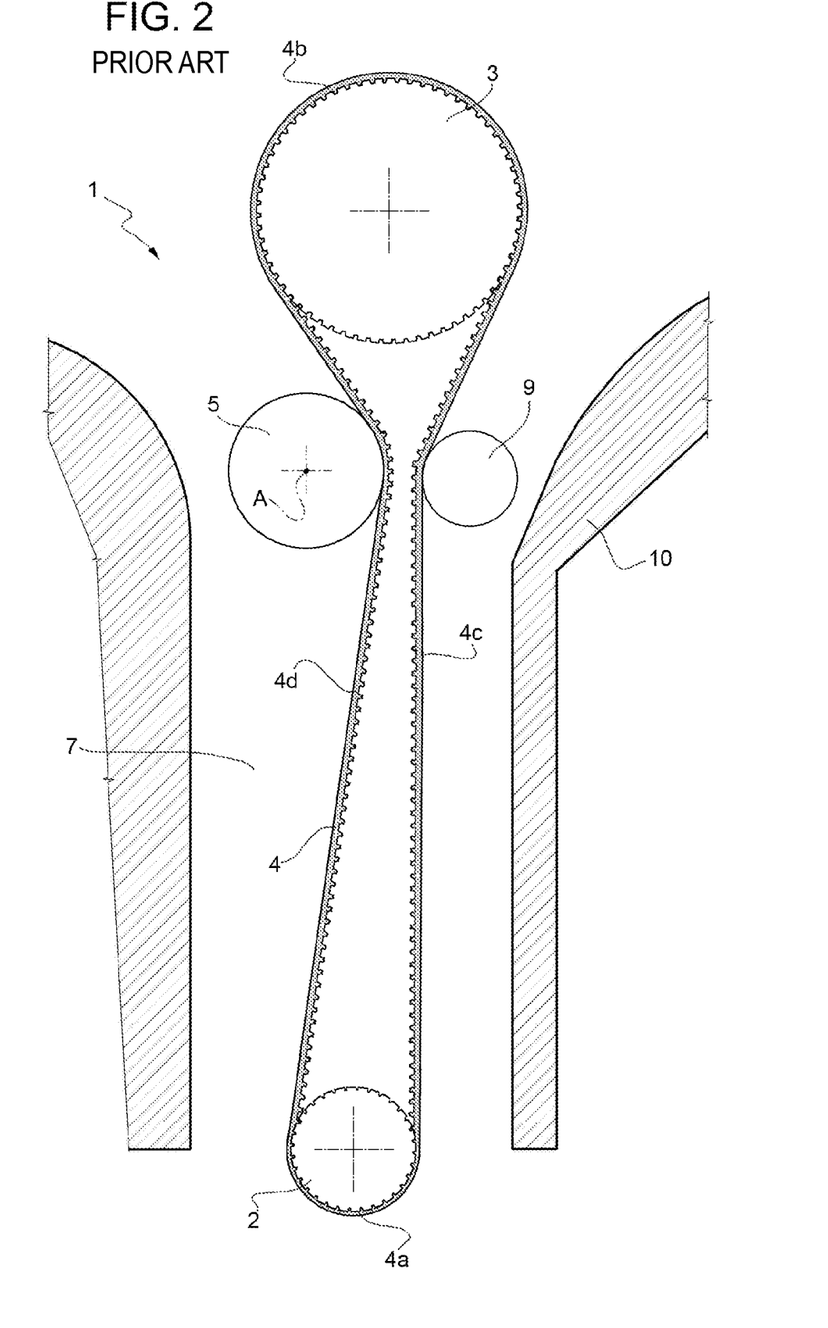
FIG. 2 is a schematic view of a second transmission system obtained according to the known art.

A transmission system equal to the transmission system of FIG. 1, but also comprising a touching belt tensioner 9 is illustrated in FIG. 2.

To enable the transmission system to house in the smallest possible space the touching belt tensioner 9 on the taut branch, this is generally arranged in front of the mechanical tensioner 5.

The use of a touching belt tensioner 9 is however expensive and complex. Furthermore, the shape of the engine and consequently of the transmission system housed in a compartment obtained in the crankcase can oblige to arrange the touching belt tensioner 9 near the driven pulley 3 and thus a long portion of the taut branch remains which in turn is subject to vibration and to "flapping"; therefore the touching belt tensioner 9 on the taut branch while being complex and expensive only very partially solves the above mentioned problems and, in particular the problem of flapping.

Therefore, there is the need for a transmission system that does not present the aforementioned problems and allows thus to eliminate or greatly reduce the vibrations on a branch of the belt.

OBJECT OF THE INVENTION

The purpose of the present invention is to provide a transmission system comprising an oil wet belt or belt in oil that solves or substantially diminishes the problem of flapping and wherein therefore the vibrations of the free branches and in particular the taut branch of the belt are very slight.

The abovementioned object is achieved by a transmission system that has a drive pulley, at least a driven pulley, an oil wet toothed belt, and a fixed containment guide. The toothed belt has a toothing and a back, a first portion of toothing coupled to the drive pulley, a second portion of toothing coupled to the driven pulley, a first taut branch which develops towards the driving pulley and a second slack branch which develops towards the driven pulley. The fixed containment guide has a first wall facing the toothing or the back of the oil wet toothed belt. This first wall is positioned a distance from the oil wet toothed belt between a minimum distance in which at rest it is not in contact with the oil wet toothed belt and a maximum distance equal to 5% of one between the taut branch and the slack branch.

BRIEF DESCRIPTION OF THE DRAWINGS

For a better understanding of the present invention a preferred embodiment purely by way of non-limiting example and with reference to the accompanying drawings is described below, wherein.

DESCRIPTION

Figure 3:
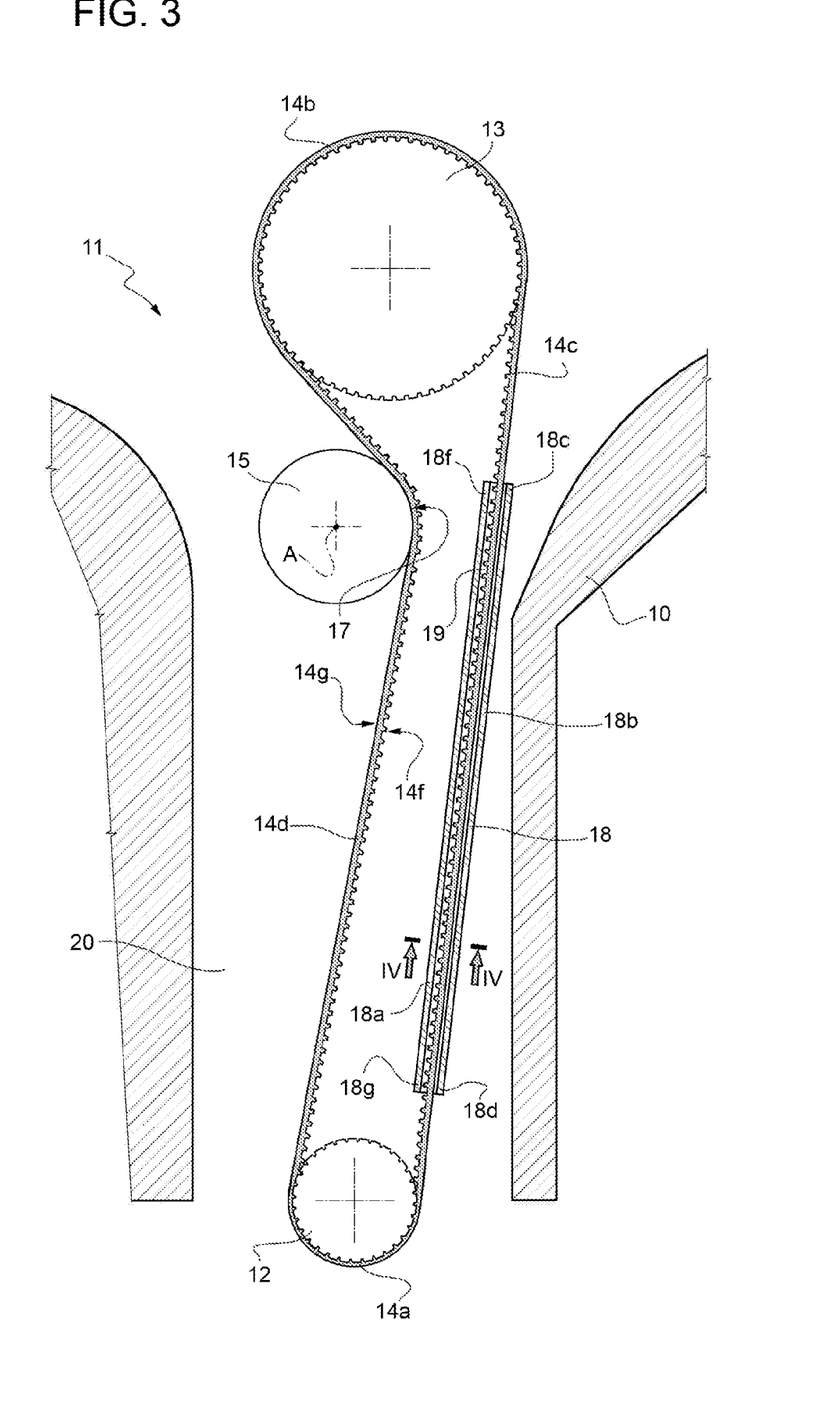
FIG. 3 is a schematic view of a transmission system obtained according to a first embodiment of the present invention.

With reference to FIG. 3, is indicated with 11 in its entirety a system for synchronous transmission of an internal combustion engine comprising a drive pulley 12 rigidly connected to a crankshaft of an internal combustion engine and a driven pulley 13, which is connected to a camshaft, which can be connected to an injection pump of the internal combustion engine with another control not shown in the figure. Moreover, the driven pulley 13 is connected to a second camshaft by way of a second transmission not shown.

Clearly, the transmission system according to the present invention can alternatively comprise further driven pulleys.

The drive pulley 12 and the driven 13 pulley are connected one to the other by way of an oil wet toothed belt 14 for the transmission of power between the two pulleys. For example, the toothed belt 14 is obtained as described in patent application WO2005080820 in the name of the same applicant.

Figure 4:
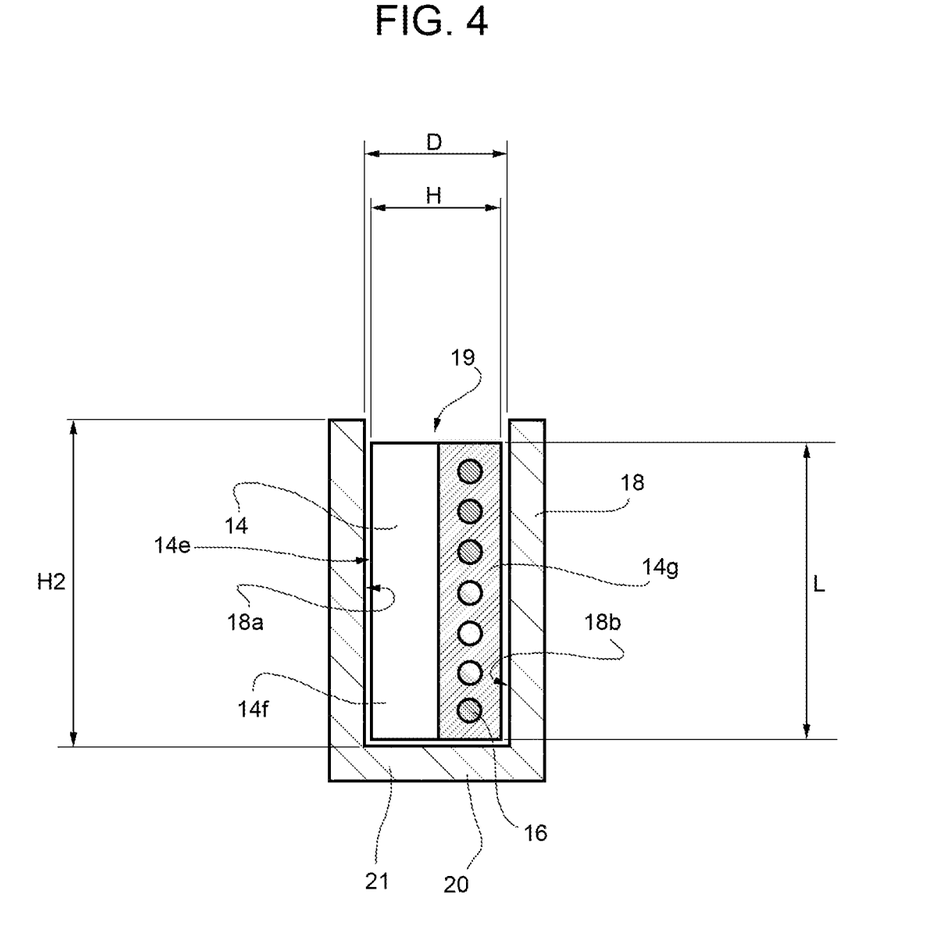
FIG. 4 is a section on the axis IV-IV of a portion of the transmission system of FIG. 3

In particular, the toothed belt 14 comprises a body of elastomeric material suitably selected to withstand the aggression of the lubricating oil, for example a polymer containing nitrile units in a percentage between 33 and 49%, a toothed portion also called toothing 14f having a surface 14e partially coupled to the drive pulley 12 and the driven pulley 13, a plurality of threadlike elements embedded in the body also called cords, numbered 16 in FIG. 4, a back 14g arranged on the opposite side of the toothed portion with respect to the teeth 14f advantageously a fabric or resistant layer arranged on the toothed portion, and optionally a second fabric or resistant layer arranged on the back.

Preferably the fabric on the toothing 14f is treated with an anti-friction agent, more advantageously with a fluorinated polymer, even more preferably with a PTFE.

Even more preferably the fabric treatment also contains an elastomer.

Even more preferably the fabric treatment contains more fluorinated polymer than elastomer.

The toothed belt 14 comprises a first portion 14a coupled to the drive pulley 12, a second portion 14b coupled to the driven pulley 13, a first taut branch 14c that develops towards the drive pulley 12 and a second slack branch 14d on the opposite side that develops towards the driven pulley 13. The slack branch 14d and the taut branch 14c are also referred to in the following as free branches.

The operating tension of the toothed belt 14 can be advantageously controlled by a tensioning device 15, preferably a mechanical tensioner.

Preferably, the tensioning device 15 cooperates with a slack branch 14d of the transmission belt 1, comprises a pulley and is rotatable about a fixed axis A with respect to a wall of the internal combustion engine.

The mechanical tensioner 15 as all the tensioning devices is kept permanently in contact against the back 14g of the toothed belt 14 by way of drive means, not shown, which may for example comprise an elastic element or a hydraulic actuator.

Advantageously, the tensioning device (15) is of a bearing type or of a containment guide type.

In particular, the mechanical tensioner 15 defines a path for the toothed belt 14 by way of a contact surface 17 on which the back 14g of the toothed belt 14 slides in use.

Figure 5:
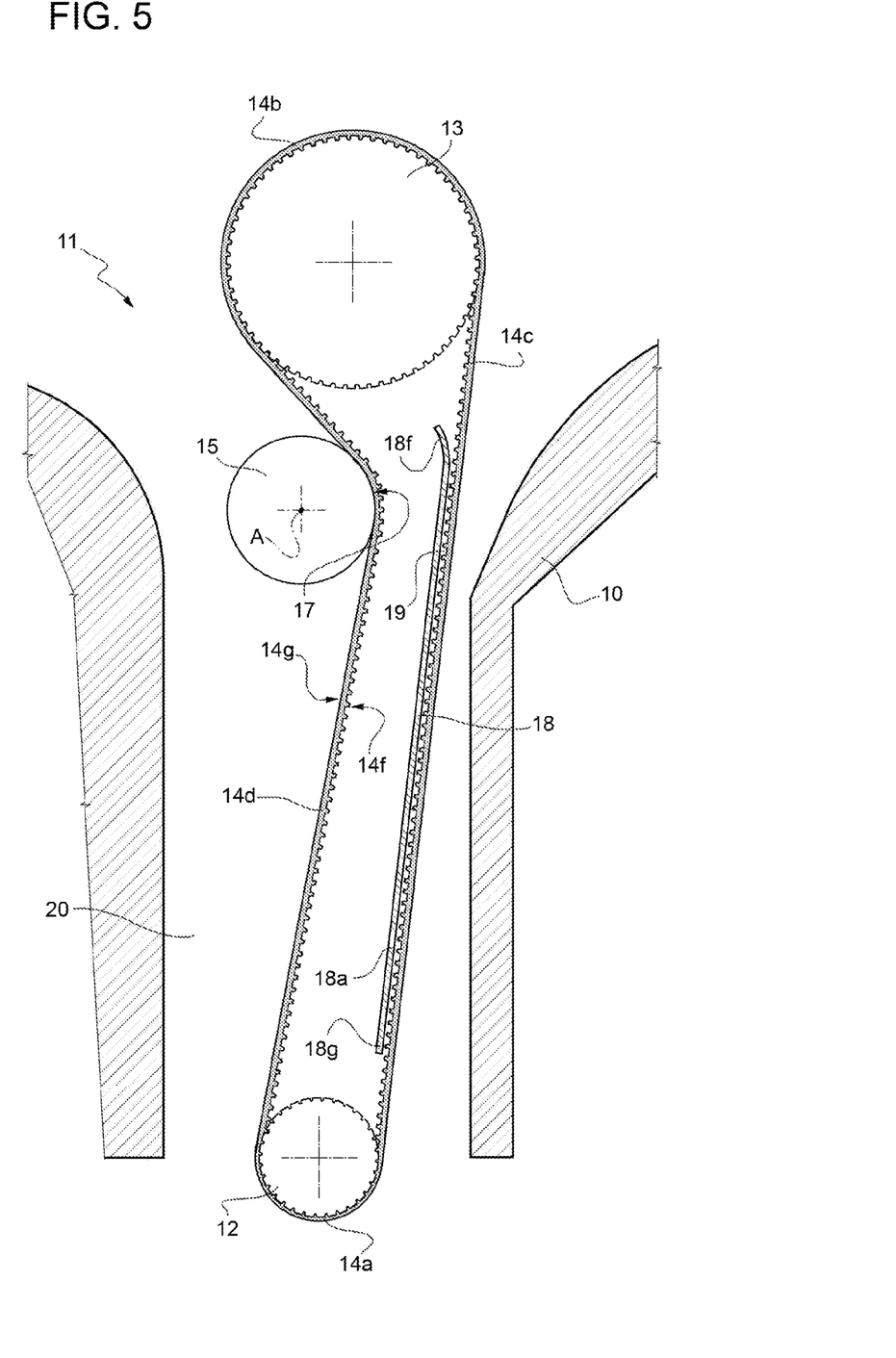
FIG. 5 is a schematic view of a transmission system obtained according to a second embodiment of the present invention.

The transmission system also comprises a fixed vibration containment guide 18 comprising at least one wall indicated with 18a or 18b in FIGS. 3, 4 and 5.

In FIG. 5 an embodiment of the invention is illustrated wherein the fixed containment guide 18 is constituted by a single wall 18a.

The wall 18a may face the toothing 14f, as in FIG. 5 or the back 14g, variant not illustrated.

The wall 18a is at a minimum distance from the toothed belt such that at rest is not in contact with the toothed belt itself and can be arranged at a maximum distance equal to 5% of the length of one between the taut branch and the slack branch.

The length of the branch is equal to the distance between the detachment point of the toothed belt 14 from a pulley 12 or 13 and the point of contact with the other pulley 13 or 12.

The wall 18a that forms the fixed vibration containment guide 18 allows to dampen the vibrations of the toothed belt 14 when the toothed belt comes into contact with the wall 18a itself during use.

The wall 18a has two end portions 18f and 18g which can present a different distance from the toothed belt 14, preferably higher, than the rest of the wall 18a itself, as shown in FIG. 5.

In a preferred embodiment the fixed vibration containment guide 18 comprises a first wall 18a facing the toothing 14f and a second wall 18b facing the back 14g. The two walls 18a, 18b are opposite and therefore have each a maximum distance from the toothed belt equal to 5% of one between the taut branch and the slack branch.

The distance D between the walls 18a, 18b is however greater than the height H of the toothed belt and in this way therefore the walls 18a, 18b define a path or channel 19 wherein said toothed belt 14 at rest is at least partially housed.

The wall 18b also has end portions 18c and 18d which may have different distances from the toothed belts, preferably greater, that the remaining portions of the wall 18b.

It is also intended that the walls 18a, 18b may have length and dimensions different one from the other.

With height H of the toothed belt 14 is intended the distance between the back 14g and the end surface 14e or top of the toothing 14f.

The distance D between the walls 18a, 18b is greater than the height H of the toothed belt 14 and at rest there is no contact between the walls 18a and 18b that form the fixed containment guide 18 and the toothed belt 14.

The wall 18a or the walls 18a, 18b that form the fixed containment guide extend for example starting from the crankcase 20 or from its opposite wall i.e. the inner wall of the transmission system protective cover, or also by the cylinder head.

The wall 18a or the walls 18a, 18b that form the fixed containment guide extend for example in correspondence with and facing the back 14g and/or the toothing 14f.

When the fixed containment guide 18 is formed by the two walls 18a, 18b forming the channel 19, this advantageously has an approximately U shape, such as that depicted in section in FIG. 4 wherein the base of the U indicated with 21 can be constituted by the crankcase 20 itself or be applied permanently affixed on the crankcase 20.

Alternatively it is also possible to envisage that the fixed containment guide 18 defines a closed channel of approximately parallelepiped shape with two faces or opposite walls in correspondence of the side surfaces or sides of the toothed belt 14 and the other two faces or walls in correspondence with the toothed portion 14f and, respectively of the back 14g, corresponding to the walls 18a and 18b of the open shape.

It is also possible that the walls 18a and 18b have holes or ports to let in/drain oil.

Alternatively it is also possible that the transmission system also comprises lubrication means to enter oil into the fixed containment guide 18.

In use, when the free branch, the taut branch 14c in the examples illustrated, of the toothed belt begins to vibrate it comes into contact with the wall 18a in the case in which there is a single wall or the walls 18a and 18b that define the fixed containment guide 18, which dampens and reduces vibrations, canceling or reducing the "flapping" phenomenon.

While it is known to use movable shoes defining a guide of approximately U shape wherein one or two walls surround the sides of the belt, on the tensioning devices the back of the belt is always in contact even at rest with the tensioning device. The tensioning devices also actively regulate the belt tension by way of a displacement of the tensioning device itself.

Conversely, the fixed containment guide 18 only serves to dampen vibration and reduce the flapping and does not allow to actively adjust the tension. So the fixed containment guide 18 differs from the tensioning devices known because it is much simpler, does not act by increasing or decreasing the tension on the toothed belt 14 and does not act by continuous contact between the belt and a surface of the tensioning device.

The toothed belt 14 then comes into contact with the wall 18a or the walls 18a, 18b of the fixed containment guide 18 only in case of vibration or "flapping" and not when the toothed belt in use is moved without arising vibrations.

Advantageously the wall 18a and/or the wall 18b extend along the toothed belt for at least the length corresponding to the distance between two teeth of the toothed belt 14 of the transmission system 11.

It is understood that, when the fixed containment guide is formed by two walls 18a, 18b, at least one of the two walls has advantageously a length corresponding to the distance between two teeth of the toothed belt 14.

Advantageously, the fixed containment guide 18 comprises a central portion 18e approximately rectilinear for at least the length of two teeth.

"Approximately rectilinear" means that it can also be slightly curved as to appear substantially rectilinear.

Clearly the central portion 18e can also be curvilinear, but with a curvature sufficient to still achieve the damping of vibrations of the toothed belt.

More advantageously, the wall 18a or the walls 18a, 18b that form the fixed containment guide 18 may or may further also have a first end portion 18f and/or 18c for the inlet of the toothed belt 14 and/or a second outlet end portion 18g and/or 18d with a greater distance from the toothed belt than the central portion 18e, as shown in FIG. 5, to facilitate the entry of the toothed belt 14 and ensure that there is a possible contact between the end portion 18f and/or 18c itself of the fixed containment guide 18 when the toothed belt 14 enters the channel 19, and that said contact can lead to premature wear of the toothed belt 14 itself.

More advantageously the fixed containment guide 18, or at least one wall 18a or 18b, extends in length along the toothed belt 14 for at least a length equal to the winding arc of a touching belt tensioner having a diameter of 30 mm and a winding angle of 20°.

More advantageously the fixed containment guide 18, or at least one wall 18a or 18b, comprises a central portion 18e approximately rectilinear or even more preferably is entirely rectilinear for a length equal to the winding arc of a touching belt tensioner having a diameter of 30 mm and a winding angle of 20°.

Even more advantageously the fixed containment guide 18 extends for a length comprised between the length of the winding arc of the toothed belt on a touching belt tensioner having a diameter of 30 mm and the winding angle of 20° and 95% of the length of a free branch of the toothed belt.

Even more preferably the fixed containment guide 18 extends for a length comprises between 25% and 50% of the length of a free branch of the toothed belt.

When the fixed containment guide 18 is formed by two walls 18a, 18b, it extends in width, and therefore has a distance D between the walls 18a and 18b greater than that of the height H of the toothed belt 14 that must slide in the channel 19 formed by the fixed containment guide 18.

For height H of the toothed belt it is intended the distance between the back 14g of the toothed belt 14 and the top of the toothed portion 14f.

Advantageously, the distance D between the walls 18a and 18b is greater than the height H of the toothed belt 14 by a distance comprised between 0.1 mm and 1.5 mm. Even more advantageously of a distance comprised between 0.5 and 1 mm.

Advantageously, the height H2 of the walls 18a and/or 18b is at least equal to half the width L of the belt. More advantageously the height of the walls 18a and/or 18b is equal to at least 75% of the width of the belt. Even more advantageously the height of the walls 18a and/or 18b is at least equal to the width of the belt plus 3 mm.

Advantageously, the fixed containment guide 18 is arranged on the taut branch 14c i.e. on the branch that develops towards the drive pulley of the toothed belt.

Alternatively, the fixed containment guide 18 is arranged on the slack branch 14d. This solution is particularly advantageous when the transmission system 11 does not comprise tensioning devices.

Alternatively it is also possible to have the fixed containment guide 18 both on the slack branch 14d and on the taut branch 14c.

According to a preferred embodiment the fixed containment guide 18 is obtained directly integral with the engine crankcase. For this purpose on a surface of the crankcase are obtained the two opposite walls 18a, 18b that define the channel 19 within which the toothed belt 14 is housed.

Alternatively the two walls 18a and 18b that form the fixed containment guide 18 are immovably affixed on the crankcase or on the inner wall of the protective cover of the transmission system or on the cylinder head.

In alternative embodiments the fixed containment guide 18 may comprise a U-shaped profile fixed on the surface of the crankcase or on the cylinder head or on the inner wall of the protective cover of the transmission system.

The individual walls 18a and 18b or the entire fixed containment guide 18 are preferably made of metallic material, but can also be made of plastic material.

Finally it is clear that the transmission system here described and illustrated can be subject to modifications and variations without departing from the protective scope of the present invention as defined in the appended claims. For example, it is possible to vary the shape and dimensions and in particular the length of the guide walls of the fixed containment guide.

The invention claimed is:

1. A transmission system comprising:
   a drive pulley,
   at least a driven pulley,
   an oil wet toothed belt, said toothed belt comprising a toothing and a back, a first portion, wherein said toothing is coupled to said drive pulley, a second portion wherein said toothing is coupled to said at least one driven pulley, a first taut branch which develops towards the driving pulley and a second slack branch which develops towards the driven pulley, and
   a fixed containment guide comprising at least a first wall facing said toothing or said back, said first wall being at a distance from said toothed belt comprised between a minimum distance in which at rest is not in contact with said toothed belt and a maximum distance equal to 5% of one between said taut branch and said slack branch.

2. The transmission system according to claim 1, further comprising a second wall facing said back, the distance D between said first and second walls-being greater than the height H of said toothed belt, said walls defining a channel in which is at least partially housed said toothed belt and at rest there is no contact between said first and second walls and said toothed belt.

3. The transmission system according to claim 2, characterized in that said fixed containment guide dampens vibrations of said belt when the toothing or the back of said toothed belt come into contact with at least one of the first wall or second wall.

4. The transmission system according to claim 2, characterized in that the distance D between said first and second walls is greater than the height H of the toothed belt by a distance comprised between 0.1 mm and 1.5 mm.

5. The transmission system according to claims 2, characterized in that the distance D between said first and second walls is comprised between 0.5 and 1 mm.

6. The transmission system according to claim 1, further comprising a tensioning device.

7. The transmission system according to claim 6, characterized in that said tensioning device is a mechanical tensioner or a tensioner shoe.

8. Transmission system according to claim 6, characterized in that said tensioning device is of a bearing type or a containment guide type.

9. The transmission system according to claim 6, characterized in that said tensioning device is maintained in contact against said back of the toothed belt by way of hydraulic or elastic drive means.

10. The transmission system according to claim 1, characterized in that said fixed containment guide defines a closed channel of approximately parallelepiped shape comprising at least the first wall facing said toothing and a second wall facing said back.

11. The transmission system according to claim 1, characterized in that said fixed containment guide extends in length for at least the length corresponding to the distance between two teeth of said toothed belt of the transmission system.

12. The transmission system according to claim 11, characterized in that the first wall which forms said fixed containment guide has an inlet portion having a distance from the toothed belt greater than at least another portion of said wall.

13. The transmission system according to claim 1, characterized in that said fixed containment guide is rectilinear for at least the length of two teeth.

14. The transmission system according to claim 1, characterized in that said fixed containment guide extends for a length comprised between the length of the winding arc of the toothed belt on a touching belt tensioner of 30 mm in diameter and the winding angle of 20° and 95% of the length of a free branch of the toothed belt.

15. The transmission system according to claim 1, characterized in that the height H2 of at least one of the first and second walls of the fixed containment guide 18*a* is at least equal to half the width L of the toothed belt.

16. The transmission system according to claim 1, characterized in that the height H2 of at least one of the first and second walls of the fixed containment guide is at least equal to the width L of the toothed belt.

17. The transmission system according to claim 1, characterized in that said fixed containment guide is arranged on the longer branch between said slack branch and said taut branch.

\* \* \* \* \*